United States Patent [19]
Krebs

[11] Patent Number: 6,083,350
[45] Date of Patent: Jul. 4, 2000

[54] SYSTEM FOR TREATMENT OF WASTE PAPER HAVING A PULPING DRUM AND A PERFORATED SORTING AREA

[75] Inventor: Jochen Krebs, Ravenssburg, Germany

[73] Assignee: Voith Sulzer Stoffaufbereitung GmbH, Ravensburg, Germany

[21] Appl. No.: 08/956,727

[22] Filed: Oct. 23, 1997

Related U.S. Application Data

[63] Continuation of application No. 08/609,883, Mar. 1, 1996.

[51] Int. Cl.[7] ................................. D21B 1/32; D21B 5/02
[52] U.S. Cl. ............................ 162/261; 241/72; 241/73; 241/79.3; 162/4; 162/55
[58] Field of Search ...................... 162/4, 5, 6, 7, 162/8, 55, 261; 241/28, 70, 71, 72, 73, 79.2, 79.3; 209/3, 17

[56] References Cited

U.S. PATENT DOCUMENTS

| | | | |
|---|---|---|---|
| 1,759,385 | 5/1930 | Witham, Jr. .................................. | 162/4 |
| 5,094,715 | 3/1992 | Ljokkoi et al. .............................. | 162/4 |
| 5,334,285 | 8/1994 | Ortner et al. ................................ | 162/4 |
| 5,518,580 | 5/1996 | Ortner et al. ................................ | 162/4 |
| 5,762,756 | 6/1998 | Scott et al. .................................. | 162/4 |

FOREIGN PATENT DOCUMENTS

| | | | |
|---|---|---|---|
| 0 218 738 | 10/1985 | European Pat. Off. .................... | 162/4 |
| 0 218 738 B1 | 10/1990 | European Pat. Off. .......... | D21B 1/30 |
| 0 486 904 A1 | 9/1991 | European Pat. Off. .......... | D21B 1/32 |
| 32 10 503 | 3/1985 | Germany ......................... | D21B 1/32 |
| 2 061 133 | 5/1981 | United Kingdom .................... | 162/55 |

*Primary Examiner*—Steven Alvo
*Attorney, Agent, or Firm*—Taylor & Aust, P.C.

[57] ABSTRACT

A wastepaper treatment method and system which combines the pulping and sorting in a pulping drum (10) with a following wet-strength processing, performed with high mechanical intensity, e.g., in a pulper (20). With the easily pulping paper materials being separated already from the drum (10) in a fines fraction (3), particular advantages result in terms of quality and economy.

11 Claims, 3 Drawing Sheets ns of application Ser. No. 08/609,883, filed Mar. 1, 1996.

SYSTEM FOR TREATMENT OF WASTE PAPER HAVING A PULPING DRUM AND A PERFORATED SORTING AREA

This is a continuation of application Ser. No. 08/609,883, filed Mar. 1, 1996.

BACKGROUND OF THE INVENTION

1. Field of the Invention

The present invention relates to a system for the treatment of waste paper, and, more particularly, to such a system including a pulping drum for the treatment of waste paper.

2. Description of the Related Art

In a first wastepaper pulping stage, as known, varied difibration machines can be used, for example pulpers, disintegrators and pulping drums. The pulper consists essentially of a loadable tub into which the wastepaper is filled, forming a more or less viscous watery suspension that fills the container up to a certain level. Contained within the filled area, for breakup and mixing, is a powered rotor. Such pulper requires constant agitation of a large liquid volume (about 95% to 85% water), which costs much energy. Unlike the pulper, a pulping drum consists substantially of a horizontal cylinder, which on part of its surface is mostly perforated and features mostly on its end faces ring-shaped bulkheads in order to prevent an undesirable escape of the stock. Mixed with water, the wastepaper is disintegrated in the pulping drum by heaving, sliding and dropping, i.e., movement of the stock ingredients relative to one another. With sorting perforations present in the drum shell, the suspended fiber stock is allowed to exit. Exemplary embodiments of such pulping drums are illustrated and described, e.g., in the German patent document 32 10 503.

Wastepaper treatment methods employing such or similar pulping drums, as known, have the advantage of a particularly sparing pulping, both in terms of sensitive fiber grades and undesirable additives to be retained in a screenable state. Part of the bargain, however, is the disadvantage that these pulping drums most favorably should be used only in conjunction with wastepaper grades of especially easy pulpability, meaning that these contain possibly no shares of paper grades that are difficult to pulp. The expert is quite familiar with the definitions of easy-to-pulp and difficult-to-pulp, with newsprint, e.g., being easy-to-pulp and "partly wet-strength," surface-treated and "wet-strength" paper grades being difficult-to-pulp. One may also speak of high or low pulpability. Stated as a measure for pulpability, e.g., may be specific work required during the pulping process in the pulper to generate a pumpable suspension. With newsprint, e.g., pulpability amounts to about 15–20 kWh/t and with liner or surface-treated papers up to 80 kWh/t. Methods employing pulping drums have for these reasons proven themselves particularly with so-called deinking material, i.e., imprinted sorted wastepaper grades which—as mentioned already—normally pulp easily.

When using drums nonetheless for grates of limited pulpability, a procedure according to the teaching, e.g., of EP 0 486 904 A1 may be chosen. According to it, the drum serves the soaking of the wastepaper. This is followed by a rough cleaning, and only thereafter is the stock pulped in its entirety, with considerable addition of pulping chemicals, in a further machine.

EP 0 218 738 proposes a method using two drums in series. The first drum serves only the pulping and mixing, and the second drum the screening of undesirable wastepaper ingredients.

SUMMARY OF THE INVENTION

The objective underlying the present invention is to provide a method allowing the effective pulping of wastepapers containing not only easy-to-pulp paper grades, but also difficult-to-pulp paper grades. The method should be favorable in terms of energy and deliver a high fiber yield. The undesirable ingredients should be removed extensively or, at least, remain sufficiently screenable.

A particular advantage of the method is that the wastepaper, to begin with, is treated by a sparing and energy-saving drum pulping known as such, and that only after separation of the fibers reclaimed in this fashion the others, the paper shares difficult to pulp, will be disintegrated and suspended. Only this distinctly smaller quantity is pulped with higher specific work. Any necessary separation of undesirable wastepaper ingredients can now be practiced on a smaller quantity, which as well is more economical. The undesirable wastepaper ingredients are often called "disturbants" and consist of, e.g., plastic foil, coatings, hard foam, to name a few.

The further treatment of the coarse fraction can quite specifically utilize the substance difference of paper and plastic, namely the different strength and different specific gravity in wet state.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
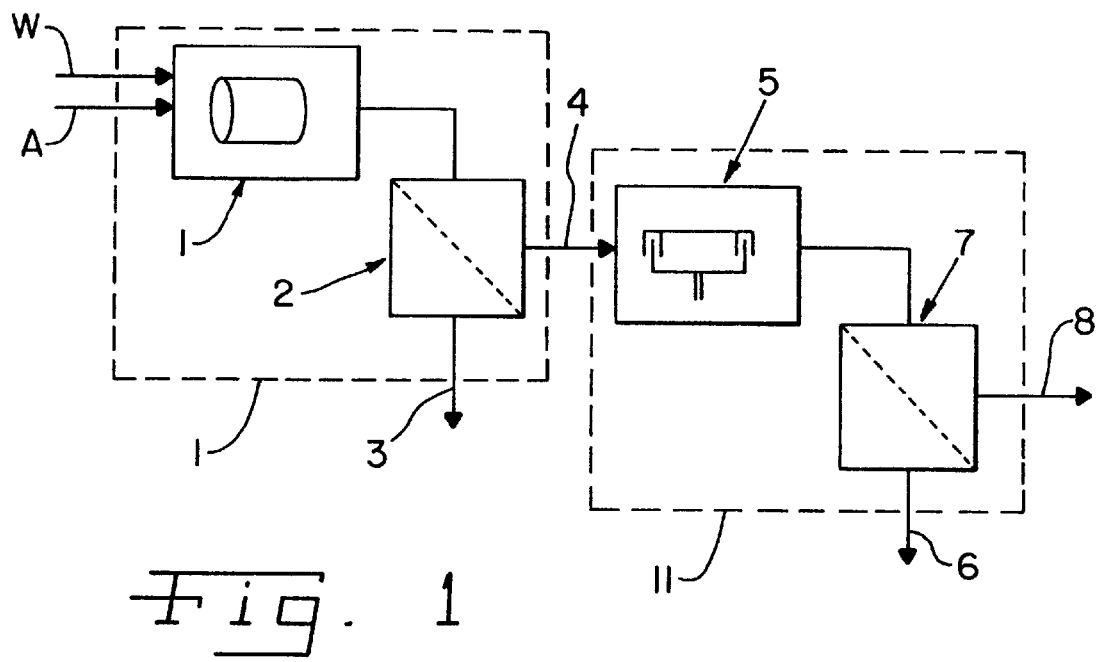
FIG. 1 is a diagram of an embodiment of the inventional method.

The process schematic according to FIG. 1 shows water W and wastepaper A which are added to a rotating drum 1. The materials are mixed intensively in drum 1, the soaked paper material being disintegrated, e.g., due to the heaving, sliding and dropping movements. The more easily pulping wastepaper can be removed already from the mixture treated this way, by separation 2, forming a fines fraction 3. The coarse fraction 4, that is, the part of the mixture rejected in the separation 2, is then subjected to further processing in a more intensive disintegration treatment 5. Following this disintegration may be a further separation 7, in which again the now disintegrated paper ingredients are obtained as difficult-to-pulp paper stock fraction 6, whereas the disturbants 8 are rejected. On this schematic illustration one may comment that, while the individual process steps follow one another in the order indicated, they may in the technical realization nonetheless take place, in part, also simultaneously. This means that part of the wastepaper contained at a certain point within the system is sortable already, whereas other ingredients at the same point still need to be disintegrated. This potential simultaneity of treatment is possible within the respective process stages, with the first stage I comprising the drum 1 and separation 2, the second stage II comprising the more intensive disintegration 5 and separation 7.

Figure 2:
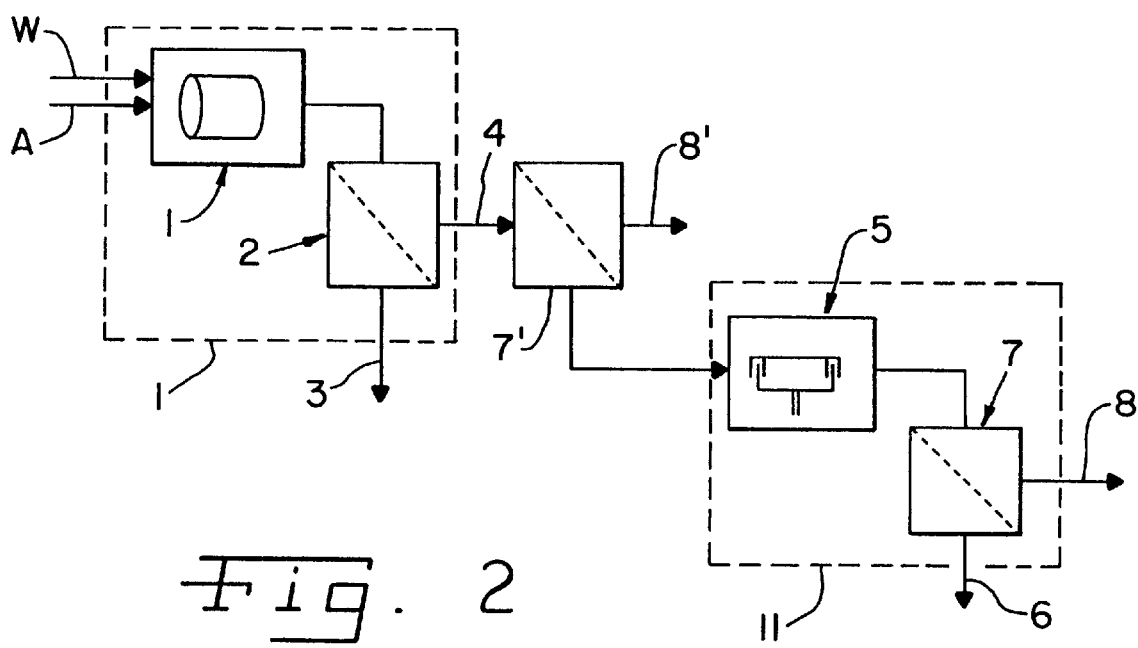
FIG. 2 is a variant of the method.

FIG. 2 shows a process with a rough cleaning 7' incorporated between the first stage I and second stage II, intended to separate coarse contaminants 8'. The second stage is relieved thereby, which is advantageous with heavily contaminated raw material.

Figure 3:
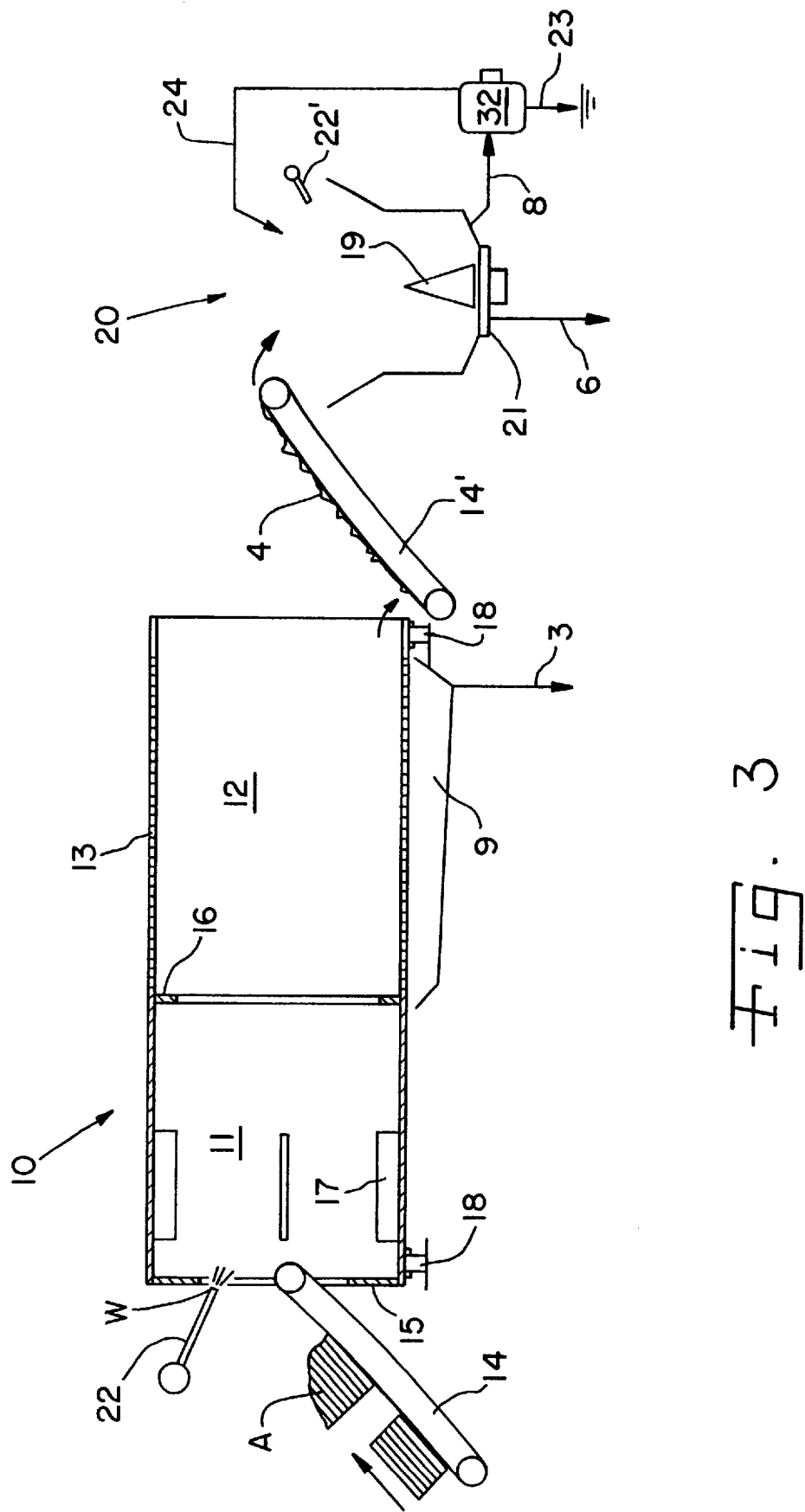
FIGS. 3–5 schematically illustrate a system for the application of the method.

FIG. 3 shows schematically a system allowing the application of the method according to the invention. Visible is a pulping drum 10 with an unperforated pulping area 11 and a perforated sorting area 12. Drum 10 is depicted here with a horizontal axis, while in many cases a slight inclination may be advantageous operationally. A conveyer 14 feeds the wastepaper material A to the loading area of the pulper, where the required water is received from line 22. Visible is an endwise bulkhead 15 with a central, open area that allows the loading. Supports 18 of the drum ensure rotational mobility and contain somewhere a drive, which is not shown here. Arranged inside the drum are dogs 17 serving to lift the mixture settled at the bottom to a point such, by drum rotation, that a dropping movement that serves the mixing and disintegration becomes possible. Such built-ins are previously known in diverse form and geared, or optimized, to the intended purpose. Present between pulping area 11 and sorting area 12 of drum 10 is an annular separator plate 16, which has a dynamic backup effect and forms a sump. A plurality of separator plates 16 may also be provided. In the sorting area 12, the drum shell is provided with a plurality of perforations 13 of a distribution such that a desired part of already pulped stock can proceed through the perforations into tub 9, where it is pumped away in the form of a fines fraction 3. Perforations 13 may have a clearance, e.g., of between 5 and 50 mm. The residues in the sorting area 12 proceed via a further conveyer 14' to a pulper 20 with a rotor 19, in which the furnished raw materials can in a fashion known as such be disintegrated with a relatively high—as compared to the drum pulping—specific energy and, as far as required, mixed with water, for instance from line 22'. This causes the non-fibrous ingredients to separate from the fibrous ingredients. The pumpable fraction of difficult-to-pulp paper materials 6 is removed by way of an accepts annular channel 21 contained at the bottom, whereas the residues proceed as rejects 8 to a rejects processing 32. The stock is disintegrated here farther still, so that rejects 23, rid extensively of fibers, discharge, while a large part of the water and the remaining fibers can be recycled to the pulper 20, e.g., through line 24.

Figure 4:
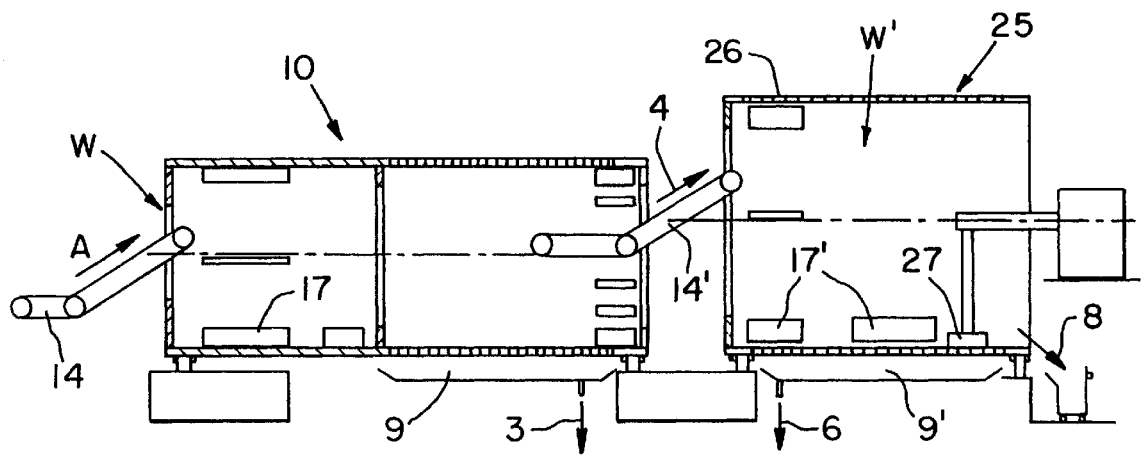

The system shown in FIG. 4 differs from the one relative to FIG. 3 essentially in that the more intensive mechanical treatment takes place not in a pulper, but in a further wet-strength pulper 25 equipped specifically for that purpose. The coarse fraction 4 is fed to pulper 25 by way of a conveyer 14' on its end side. The higher mechanical intensity required here according to the method can be achieved, e.g., by making the drum diameter larger and thus obtaining a greater drop height for the material to be disintegrated, or by providing specific built-ins, or in that increased separating forces act on the fiber bond. Conceivable, e.g., are built-ins that are provided with fixed crushing elements 27 suited to crush the wastepaper material in interaction with the moving drum wall. Possible just as well is powering such crushing elements 27; what matters is merely a relative velocity between drum wall and elements. Further measures for intensifying the mechanical treatment would be the addition of chemicals and/or heating of the stock. Both could be effected with any water W' addition. The wet-strength pulper 25 features perforations 26 through which the fibrous stock, pulped already, can proceed to tub 9' for further use—as intended—as a pumpable fraction of difficult-to-pulp paper stock 6. The disturbants 8 rejected also after the intensive mechanical treatment can then be dewatered and separated from the papermaking process.

Figure 5:
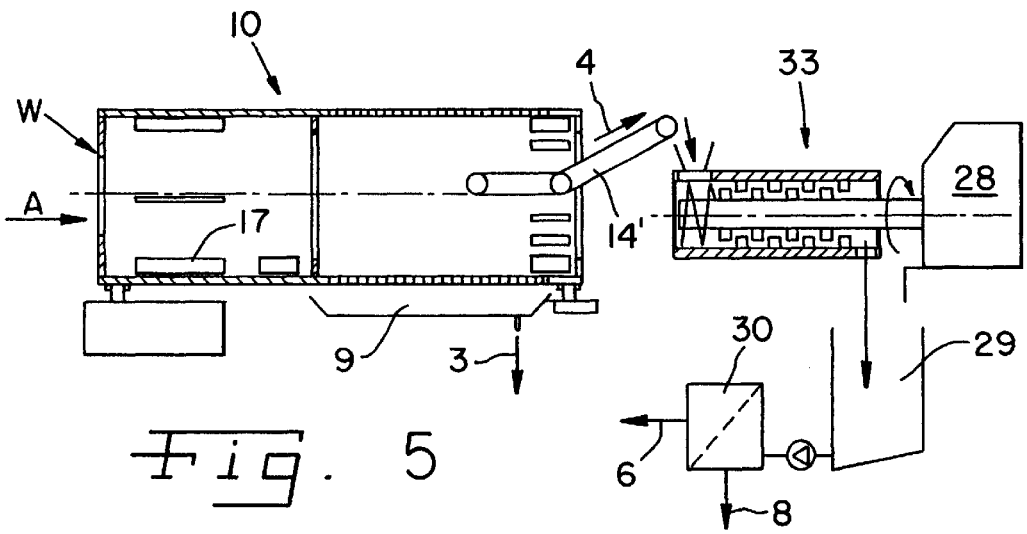
Figure 6:
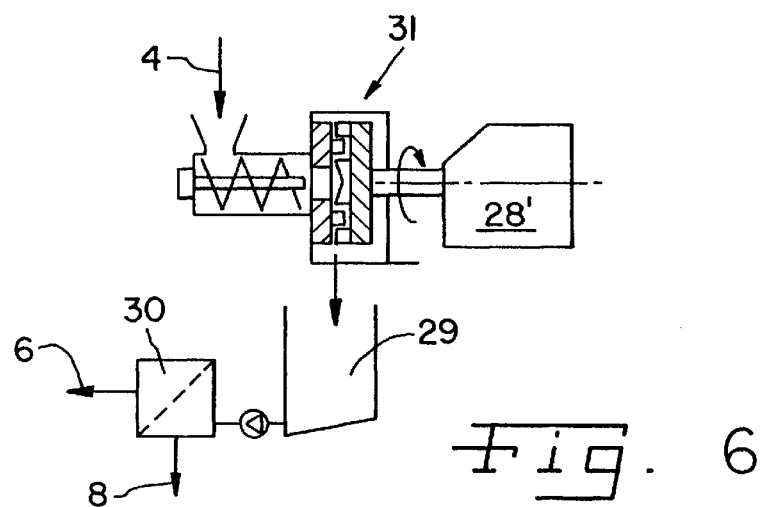
FIG. 6 is a detail variant of the system shown in FIG. 5.

With the ingredients contained in the wastepaper being especially hard to pulp, the more intensively this integration treatment may be carried out, favorably in a kneader 33, as indicated in FIG. 5. Kneader 33 has a horizontal shaft powered by a strong motor 28. In such case, the coarse fraction stemming from the pulping drum 10 is introduced in the kneader 33. Such kneaders are known for the disintegration of wastepaper. They operate at approximately 8% to 30% dry content, applying mechanical shear forces between the materials being disintegrated, without allowing any actual cut, since the tooling moving relative to one another does not touch. The stock broken up in this fashion is normally pumpable upon dilution, e.g., with water in a vat 29. The stock can then be treated with the aid of a sorter 30, thereby separating the pumpable fraction of difficult-to-pulp paper materials 6 from the disturbants 8. Using a disintegrator 31 (FIG. 6) with radial stock flow—known also as disperser—instead of a kneader 33 may be favorable in other cases. In disintegrator 31, the disintegration tooling moves at a definitive mutual spacing.

As mentioned before, the method according to the invention, respectively the systems according to the invention, allow(s) an especially good removal of disturbants—notably plastic foil—from the wastepaper mixture. As generally known, such method involves appreciable equipment expense, so that a reduction of the amount to be treated offers a considerable advantage.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for treating wastepaper containing shares of different grades, including a wet-strength paper grade of lower pulpability, said system comprising:

a rotatable pulping drum including a pulping area and a sorting area, said pulping drum configured on one end thereof for allowing an introduction of the wastepaper to be treated and of water for forming a mixture with the wastepaper, said pulping drum including dogs on an inside surface thereof providing a heaving and falling of the mixture due upon rotation of said pulping drum, said pulping drum including two longitudinal ends and a shell disposed between said two longitudinal ends, said shell having a plurality of perforations in the sorting area, said perforations having a clearance between approximately 5 and 50 mm through which part of the mixture can be removed as a fines fraction, said perforations thereby separating a coarse fraction from said fines fraction; and a further pulper for receiving said coarse fraction, said further pulper being structured and arranged for disintegrating wet-strength paper grades to pumpability.

2. The system according to claim 1, further comprising a coarse cleaning machine for receiving said coarse fraction, said coarse cleaning machine separating coarse contaminations from said coarse fraction.

3. The system according to claim 2, wherein said coarse cleaning machine includes at least one screen for separating said coarse contaminants from said coarse fraction.

4. The system according to claim 1, wherein said further pulper includes a sorting stage in which the wet-strength paper grades are separated from said coarse fraction.

5. The system according to claim 4, wherein said further pulper comprises a wet-strength pulping drum having a shell, and said sorting stage comprises a plurality of perforations in said shell of said wet-strength pulper.

6. The system according to claim 4, wherein said further pulper includes a powered rotor, and wherein said sorting stage comprises a screen plate mounted in the bottom of said further pulper and partitioning off an accepts annular channel.

7. The system according to claim 1, wherein said further pulper comprises a kneader and a sorting stage disposed after said kneader.

8. The system according to claim 1, wherein said further pulper comprises a disintegrator and a sorting stage disposed after said disintegrator.

9. The system of claim 1, wherein said shell is substantially annular.

10. The system of claim 1, wherein said drum includes at least one separator plate disposed between said pulping area and said sorting area.

11. The system of claim 10, wherein said at least one separator plate is substantially annular.

* * * * *